(12) United States Patent
Kang (10) Patent No.: US 10,107,476 B2
(45) Date of Patent: Oct. 23, 2018

(54) LUMINOUS FLUX CONTROL MEMBER, LIGHT EMITTING DEVICE, AND DISPLAY DEVICE

(71) Applicant: LG INNOTEK CO., LTD., Seoul (KR)

(72) Inventor: Lee Im Kang, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 240 days.

(21) Appl. No.: 14/563,207

(22) Filed: Dec. 8, 2014

(65) Prior Publication Data

US 2015/0159835 A1    Jun. 11, 2015

(30) Foreign Application Priority Data

Dec. 9, 2013 (KR) .................. 10-2013-0152404

(51) Int. Cl.
| | |
|---|---|
| *F21V 3/00* | (2015.01) |
| *F21V 7/00* | (2006.01) |
| *F21V 5/04* | (2006.01) |
| *G02B 19/00* | (2006.01) |
| *F21V 13/04* | (2006.01) |
| *F21Y 105/10* | (2016.01) |
| *F21Y 115/10* | (2016.01) |

(52) U.S. Cl.
CPC .............. *F21V 7/0033* (2013.01); *F21V 5/04* (2013.01); *F21V 5/046* (2013.01); *F21V 7/0091* (2013.01); *F21V 13/04* (2013.01); *G02B 19/0028* (2013.01); *G02B 19/0061* (2013.01); *G02B 19/0071* (2013.01); *F21Y 2105/10* (2016.08); *F21Y 2115/10* (2016.08)

(58) Field of Classification Search
CPC .... F21Y 2101/00; F21Y 2115/10; F21V 5/04; F21V 5/045

USPC ....................... 362/311.02, 311.06
See application file for complete search history.

(56) References Cited

U.S. PATENT DOCUMENTS

| | | | | |
|---|---|---|---|---|
| 9,404,638 | B2 * | 8/2016 | Seki | ............ F21V 5/04 |
| 2006/0083003 | A1 * | 4/2006 | Kim | ............ F21V 5/04 |
| | | | | 362/327 |
| 2008/0297918 | A1 | 12/2008 | Park et al. | |
| 2013/0088857 | A1 * | 4/2013 | Lee | ...... G02B 19/0028 |
| | | | | 362/97.1 |
| 2013/0234183 | A1 | 9/2013 | Tsai et al. | |
| 2013/0240928 | A1 * | 9/2013 | Jang | ............ F21V 5/04 |
| | | | | 362/327 |

FOREIGN PATENT DOCUMENTS

| | | |
|---|---|---|
| KR | 10-2012-0079230 A | 7/2012 |
| KR | 10-2013-0061796 A | 6/2013 |

OTHER PUBLICATIONS

European Search Report dated Apr. 29, 2015 issued in Application No. 14196908.9.

* cited by examiner

*Primary Examiner* — William Carter
(74) *Attorney, Agent, or Firm* — KED & Associates LLP (57) ABSTRACT

The luminous flux control member includes a surface of incidence, a first optical surface formed to be recessed toward the surface of incidence and configured to reflect at least some of incident light passing through the surface of incidence, and a second optical surface formed to extend from the first optical surface and configured to reflect at least some of incident light passing through the first optical surface. The second optical surface includes a plurality of sections having different slopes.

8 Claims, 4 Drawing Sheets

LUMINOUS FLUX CONTROL MEMBER, LIGHT EMITTING DEVICE, AND DISPLAY DEVICE

CROSS-REFERENCE TO RELATED APPLICATION

This application claims priority under 35 U.S.C. § 119 to Korean Application No. 10-2013-0152404 filed on Dec. 9, 2013, whose entire disclosure is incorporated herein by reference.

BACKGROUND

1. Field

The present application relates to a luminous flux control member, a light emitting device, and a display device.

2. Background

A liquid crystal display (LCD) is a device which converts a variety of kinds of electrical information generated from various devices into visible information using a change in liquid crystal transmittance according to an applied voltage, and transmits the visible information. The LCD requires back light because it does not have self-luminosity. However, since the LCD can consume low power, has a light weight and has a thin thickness, it is used widely.

Further, since the LCD does not have the self-luminosity, a backlight unit (BLU) serving as a light emitting device providing light should be provided at a rear surface of a liquid crystal panel on which an image is displayed.

The LCD includes the liquid crystal panel including a color filter substrate and an array substrate spaced a predetermined distance from each other to face each other, a liquid crystal layer interposed between the color filter substrate and the array substrate, and the BLU configured to irradiate the liquid crystal panel with light. The BLU used in the LCD may be classified into an edge type and a direct type according to a position of a light emitting diode serving as a light source.

In the edge type BLU, the light emitting diodes serving as light sources are arranged at a side surface of a light guide panel, and the light guide panel irradiates the liquid crystal panel with light radiated from the light emitting diodes through total reflection or the like.

The direct type BLU uses a diffusion plate instead of the light guide plate, and the light emitting diodes are disposed at a rear surface of the liquid crystal panel. Therefore, the light emitting diodes irradiate the rear surface of the liquid crystal panel with light.

Illumination uniformity in the LCD is an important factor which determines quality of the LCD, and the BLU should uniformly irradiate the liquid crystal panel with the light.

BRIEF DESCRIPTION OF THE DRAWINGS

The embodiments will be described in detail with reference to the following drawings in which like reference numerals refer to like elements wherein.

DETAILED DESCRIPTION

Figure 1:
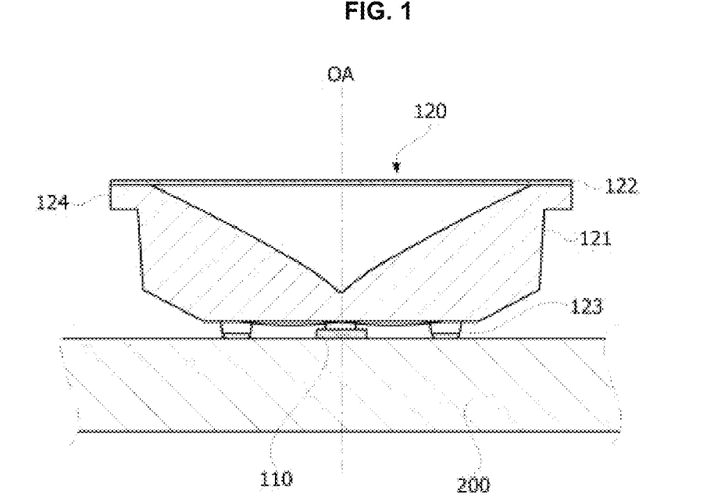
FIG. 1 is a side cross-sectional view of a light emitting device according to one embodiment of the present application.

Referring to FIG. 1, the light emitting device includes a light emitting element 110, an optical member 120, a driving substrate 200, and the like.

The light emitting element 110 is arranged on the driving substrate 200, and electrically connected to a circuit pattern formed on the driving substrate 200. The light emitting element 110 is operated as a light source configured to receive an electric signal from the circuit pattern of the driving substrate 200, to convert the electric signal into an optical signal, and to output the converted optical signal. In the embodiment of the present application, the description will be made using a case in which the light emitting element 110 is a light emitting diode acting as a point light source as an example, but the present application is not limited thereto.

The optical member 120 may include a lens 121, a cover 122 arranged on the lens 121, and the like. Further, the optical member 120 may further include at least one supporting part 123 provided at a surface of incidence of the lens 121 to support the lens 121 on the driving substrate 200, and a flange 124 formed to extend from an upper surface of the lens 121 to support the cover 122 coupled to the upper surface of the lens 121.

Opposed surfaces of the lens 121 and the cover 122 may be partly bonded with each other by an adhesive member, such as a sheet and a film, containing a polyimide-based resin or an epoxy resin impregnated in a glass fiber.

The lens 121 may be disposed on the light emitting element 110 to cover at least part of an outer surface of the light emitting element 110. The lens 121 is a luminous flux control member which refracts light incident from the light emitting element 110 and controls a light path, and may enhance brightness uniformity of the light emitting device. A shape and an optical property of the lens 121 will be described in detail with reference to FIGS. 3 to 5 which will be described later.

The cover 122 may be arranged on the lens 121. The cover 122 is arranged on the lens 121 to cover a part of an area including a center portion of the lens 121, and serves to transmit only some of the incident light passing through the upper surface of the lens. The cover 122 may absorb, reflect or refract at least some of the output light passing through the lens 121.

When the cover 122 is not provided, most of the output light passing through the upper surface of the lens 121 is moved toward a center portion of the light emitting device, and this may cause mura in which the center portion of the light emitting device becomes very bright. Therefore, the cover 122 may transmit only some of the incident light passing through the upper surface of the lens 121 to prevent the light from being concentrated to the center portion of the light emitting device, thereby preventing the mura.

In the specification, the center portion of the light emitting device may correspond to a predetermined region centering on an optical axis OA. Further, the optical axis OA may correspond to a virtual straight line which indicates a moving direction of the light at a center of a three-dimensional luminous flux from a point light source. For example, in FIG. 1, the optical axis OA may coincide with a virtual axis which extends to pass through centers of an optical surface formed at an upper portion of the lens 121 and the surface of incidence formed at a lower portion of the lens 121.

The cover 122 may have a light transmittance of 70% or less. The cover 122 may be provided so that a ratio (hereinafter referred to as "light transmittance") of an amount of the light passing through the cover 122 and moving toward the center portion of the light emitting device to an amount of the light passing through the upper surface of the lens 121 and incident on the surface of incidence of the cover 122 is 70% or less.

The cover 122 may be disposed to cover at least a part of an optical surface S2 of the lens 121. The cover 122 may be designed to have a surface area which is the same as or smaller than the upper surface of the lens 121 cut to be horizontal with the cover 122, such that the light transmittance with respect to only the light moving to the center portion of the light emitting device is controlled.

The cover 122 may be provided by forming a coating layer on a substrate. For example, the cover 122 may be provided by forming the coating layer such as polymethyl methacrylate on the substrate formed of an acryl resin, such as polymethyl metaacrylate (PMMA), or a polyethylene terephthalate (PET) resin, a poly carbonate (PC) resin, a cycloolefin copolymer (COO) resin, or a polyethylene naphthalate (PEN) resin.

The cover 122 may include a reflecting layer including a reflecting pattern. In this case, the cover 122 may reflect some of the light incident on the surface of incidence of the cover 122 from the first optical surface S2 of the lens 121 through the reflecting pattern, and thus may control the light transmittance.

When the reflecting layer is provided on the surface of incidence of the cover 122, the light reflected by the cover 122 may be moved to an edge region of the light emitting device rather than the center portion thereof by the lens 121. The mura is improved, and the cover region of the lens 121 is also increased.

Further, the cover 122 may include a diffusion sheet. In this case, the cover 122 diffuses some of the light incident on the surface of incidence of the cover 122 from the first optical surface S2 of the lens 121, and moves it to another region other than the center portion of the light emitting device.

Figure 2:
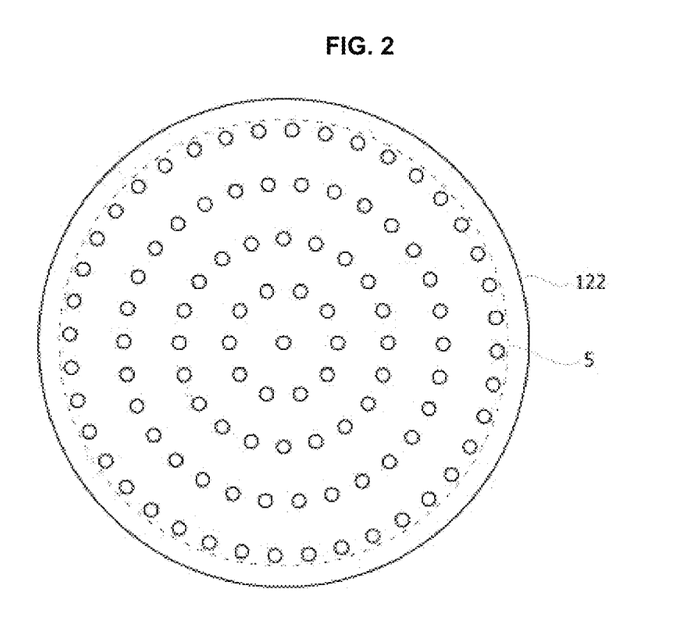
FIG. 2 is a view illustrating an example of a cover applied to the light emitting device according to one embodiment of the present application.

As illustrated in FIG. 2, the cover 122 may include a plurality of through-holes 5 through which only some of the light incident from the upper surface of the lens 121 passes. When the cover includes the plurality of through-holes to control the light transmittance, the cover 122 may be formed of a material having a lower light transmittance than a predetermined value, or the reflecting layer is formed on the surface of incidence, and thus most of the light incident on another region other than the through-holes may be absorbed or reflected.

Further, the light transmittance may be controlled by controlling a size and a distribution of the through-holes. For example, assuming that most of the light incident on another surface other than the through-holes is reflected or absorbed, a total area occupied by the plurality of through-holes 5 in the cover 122 may be controlled to 70% or less, and thus the light transmittance of the cover 122 may be controlled to 70% or less.

The cover 122 may be formed to have different thicknesses according to a property of the light emitting device, a shape of the lens or the like. For example, when the light emitting device is used as a backlight unit of an LCD, the cover 122 may have a thickness of 500 um or less.

Meanwhile, in FIG. 1, for example, a case in which one light emitting element 110 and one optical member 120 are arranged at one driving substrate 200 is illustrated. However, the embodiment of the present application is not limited thereto. For example, a plurality of light emitting elements 110 may be arranged at one driving substrate 200. Also, for example, a plurality of optical members 120 may be arranged to correspond to one light emitting element 110.

Figure 3:
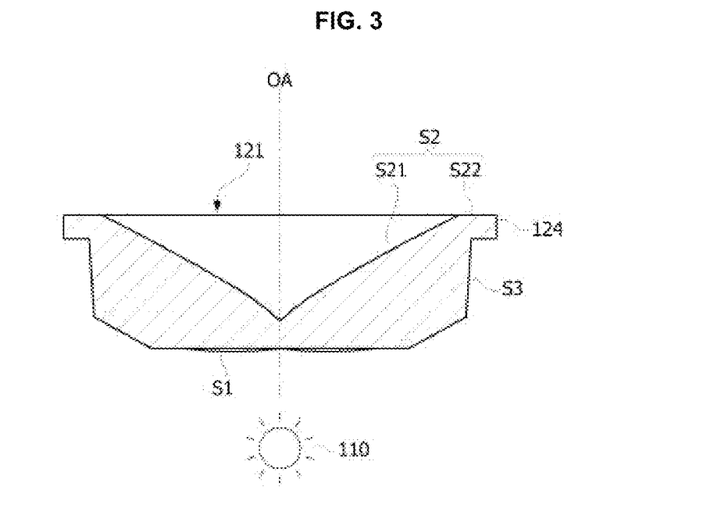
FIG. 3 is a cross-sectional view illustrating a lens shape applied to the light emitting device according to one embodiment of the present application.

The shape of the lens applied to the light emitting device according to one embodiment of the present application will be described with reference to FIGS. 3 and 4. FIG. 3 is a cross-sectional view illustrating the lens shape applied to the light emitting device according to one embodiment of the present application. Also, FIG. 4 is a view illustrating a slope of the second optical surface in a lens of FIG. 3.

Figure 4:
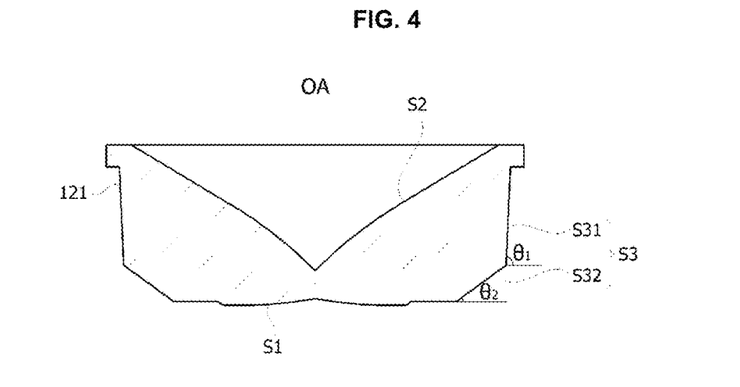
FIG. 4 is a view illustrating a slope of a second optical surface in a lens of FIG. 3.

Referring to FIGS. 3 and 4, the lens 121 includes a surface S1 of incidence, a first optical surface S2 formed to be recessed toward the surface S1 of incidence, and a second optical surface S3 formed to extend from the first optical surface S2, and may be formed in a solid type.

The surface S1 of incidence is an optical surface on which the light radiated from the light emitting element 110 is incident, and may be arranged above the light emitting element 110 to face the light emitting element 110. When the light emitting element 110 is disposed at an outer side of the lens 121, the surface S1 of incidence of the lens 121 may be formed at a lower surface of the lens 121 opposed to the light emitting element 110.

The surface S1 of incidence may include a spherical or aspherical surface. In this case, as illustrated in FIG. 2, a cross section of the surface S1 of incidence cut in an axial direction of the optical axis OA may include a curved section.

The surface S1 of incidence may include a flat surface. In this case, a cross section of the surface S1 of incidence cut in an axial direction of the optical axis OA may include a linear section.

The surface S1 of incidence may include one or more concave portion (not shown) formed to be recessed toward the upper portion of the lens 121. In this case, a part or whole of the light emitting element 110 may be accommodated in the concave portion formed in the lower surface of the lens 121. The light emitted from the light emitting element 110 may be incident on the lens 121 through an inner surface of the concave portion.

The surface S1 of incidence may include one or more convex portion formed to protrude toward the light emitting element 110. The surface S1 of incidence may be rotationally symmetric about the optical axis OA. Further, the surface S1 of incidence may be rotationally asymmetric about the optical axis OA.

As illustrated in FIG. 1, the lens 121 may be provided to be separated from the light emitting element 110. In this case, the light emitted from the light emitting element 110 may be incident on the lens 121 through one surface arranged opposed to the light emitting element 110. The surface of incidence may be realized at an outer surface of the lens 121.

Meanwhile, in FIG. 1, for example, a case in which the light emitting element 110 is arranged to be spaced from the lens 121 is illustrated. However, the lens 121 may be realized in an integrated optical lens (IOL) type in which the light emitting element 110 is accommodated in the lens 121, i.e., may be formed integrally with the light emitting element. In this case, the surface of incidence of the lens 121 may be an inner surface of the lens 121 corresponding to a boundary surface with the light emitting element 110 rather than an outer surface of the lens 121.

The first optical surface S2 is an optical surface which reflects or refracts the incident light which passes through an inner side of the lens 121. The first optical surface S2 may be provided opposite to the surface S1 of incidence, and may include a concave portion S21 formed at a center portion thereof to be recessed toward the light source.

The concave portion S21 may include an inclined surface formed in a cone shape in which a recessed level gradually increases from the edge portion thereof toward the center portion thereof. A vertex of the concave portion S21 may be located at the optical axis OA.

A slope of the inclined surface forming the concave portion may gradually increase or decrease as it goes to the vertex. In this case, a cross section of the inclined surface forming the concave portion in the direction of the optical axis OA may include a curved section.

The slope of the inclined surface forming the concave portion may be constantly maintained without any change. The cross section of the inclined surface forming the concave portion in the direction of the optical axis OA may include a linear section.

The concave portion S21 may be rotationally symmetric about the optical axis OA. Further, the first optical surface S2 may be rotationally asymmetric about the optical axis OA. The first optical surface S2 may further include a flat surface S22 formed at an edge portion thereof in parallel with a lower surface of the cover 122. The flange 124 may be formed at an edge region of the flat surface S22 to extend outward.

The second optical surface S3 may be formed to be bent or curved downward from the first optical surface S2 toward the surface S1 of incidence, and may form an outer surface of the luminous flux control member. In the specification, the bending may correspond to a shape which is sharply bent. For example, when two surfaces are bent to form a curved surface having a radius of curvature of about 0.1 mm or less, it may be said that the two surfaces are bent. Further, the curving may correspond to a shape which is gently bent. For example, when two surfaces are bent to form a curved surface having a radius of curvature larger than about 0.1 mm, it may be said that the two surfaces are curved. Further, an inflecting means a shape in which a curved surface is bent, while variation tendency of the curved surface is changed. For example, when a convexly curved surface is bent and changed into a concavely curved surface, it may be said that the curved surface is inflected.

The second optical surface S3 may include a plurality sections S31 and S32 having different slopes. The slope may correspond to an angle formed by outer surfaces of a first section S31 and a second S32 with respect to a surface vertical to the optical axis OA. The first section S31 is a section connected at the first optical surface S2, and may be formed to be bent or curved from the first optical surface S2 toward the surface S1 of incidence. The second section S32 is formed to extend from the first section S31 toward the surface S1 of incidence, and connected with the surface S1 of incidence.

Both of a slope θ1 of the first section S31 and a slope θ2 of the second section S32 may be designed to be less than 90 degrees, and may be changed according to a standard of the lens 121. Since both of the first and second sections S31 and S32 are designed to be less than 90 degrees, the first and second sections S31 and S32 are farther from the optical axis OA, as being father from the surface S1 of incidence, i.e., toward the upper surface of the lens 121.

To obtain a desired optical property, a ratio (θ2/θ1) of the slope of the second section S32 to the slope of the first section S31 may be set to satisfy 0.2 to 0.8. When the ratio (θ2/θ1) of the slope of the second section S32 to the slope of the first section S31 is less than 0.2, a clear aperture of the surface S1 of incidence may be encroached up. When the ratio (θ2/θ1) of the slope of the second section S32 to the slope of the first section S31 is more than 0.8, there is a problem in that illumination distribution of the lens 121 considerably different from a normal distribution shape.

Cross sections of the first and second sections S31 and S32 in a direction of the optical axis OA may include the linear sections.

The cross sections of the first and second sections S31 and S32 in a direction of the optical axis OA may include the curved sections. The second optical surface S3 may be rotationally symmetric or asymmetric about the optical axis OA.

In the lens 121 having the above-mentioned structure, the first optical surface S2 may serves as a total reflection surface which totally reflects at least some of the incident light. Since the second optical surface S3 includes the two surfaces S31 and S32 which may control an optical path, the second optical surface S3 serves as a total reflection surface as well as a refraction surface. The lens 121 may move the light incident from the light source 110 to an optical path formed in an order of refraction (the surface S1 of incidence), reflection (the first optical surface S2) and another refraction (the second optical surface S3) as well as an optical path formed in an order of refraction (the surface S1 of incidence), reflection (the first optical surface S2), another reflection (the second optical surface S3) and another refraction (the first optical surface S2 or the second optical surface S3).

Figure 5:
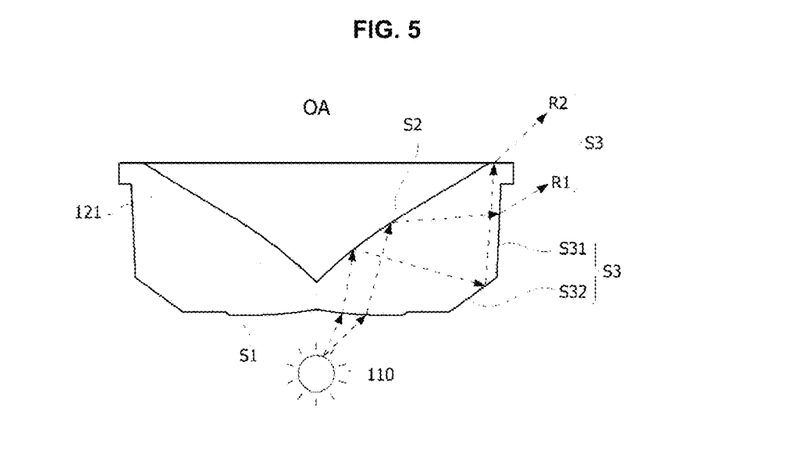
FIG. 5 is a view illustrating an optical property of the lens according to one embodiment of the present application.

FIG. 5 is a view illustrating the optical property of the lens according to one embodiment of the present application. Some of the light emitted from the light source 110 is refracted through the surface S1 of incidence and then incident on the concave portion (referring to reference numeral S21 of the FIG. 2) of the first optical surface S2. The concave portion S21 totally reflects at least some of the incident light toward the second optical surface S3.

The concave portion S21 of the first optical surface S2 is the total reflection surface. Some R1 of the incident light may be totally reflected toward the first section S31 of the second optical surface S3, and some R2 of the incident light may be totally reflected toward the second section S32 of the second optical surface S3.

The first section S31 of the second optical surface S3 may be the refraction surface by which at least some R1 of the incident light totally reflected by the first optical surface S2 is refracted and output to an outer side. The second section S32 of the second optical surface S3 may be the refraction surface by which at least some R2 of the incident light totally reflected by the first optical surface S2 is totally reflected toward the first optical surface S2, and the totally reflected light R2 is refracted and output to an outer side by the first optical surface S2.

The second section S32 of the second optical surface S3 may be the refraction surface by which at least some of the incident light totally reflected by the first optical surface S2 may be totally reflected toward the first section S31 of the second optical surface S3. In this case, the light totally reflected by the second section S32 of the second optical surface S3 may be refracted and output to the outer side by the first section S31 of the second optical surface S3.

In FIGS. 1 to 4, for example, a case in which the upper surface of the lens 121 includes the flange 124 to attach the cover 122 is illustrated. However, the present application is not limited thereto. According to the present application, the lens 121 may be provided without the flange 124.

Figure 6:
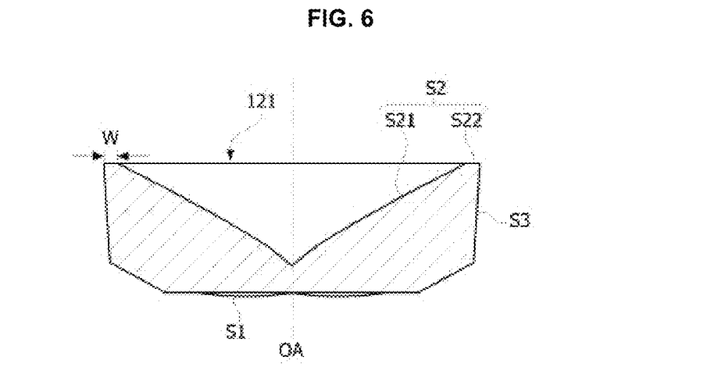
FIG. 6 is a view illustrating another lens applied to the light emitting device according to one embodiment of the present application.

FIG. 6 is a view illustrating another embodiment of the lens applied to the light emitting device according to one embodiment of the present application. The lens 121 includes a concave portion S21 and a flat surface S22. Unlike the lens illustrated in FIG. 3, the flange may be omitted. Therefore, the cover 122 may be attached on the flat surface S22 of the lens 121.

The flat surface S22 may be bonded to one surface of the cover 122 by an adhesive member, and may be formed to have a predetermined width W22 and thus to prevent the cover 122 from being separated. The width W22 of the flat surface S22 may be changed according to the lens properties such as a size and a shape of the lens 121. For example, the flat surface S22 may be provided to have a width W22 of 0.5 mm to 1 mm, but is not limited thereto.

Figure 7:
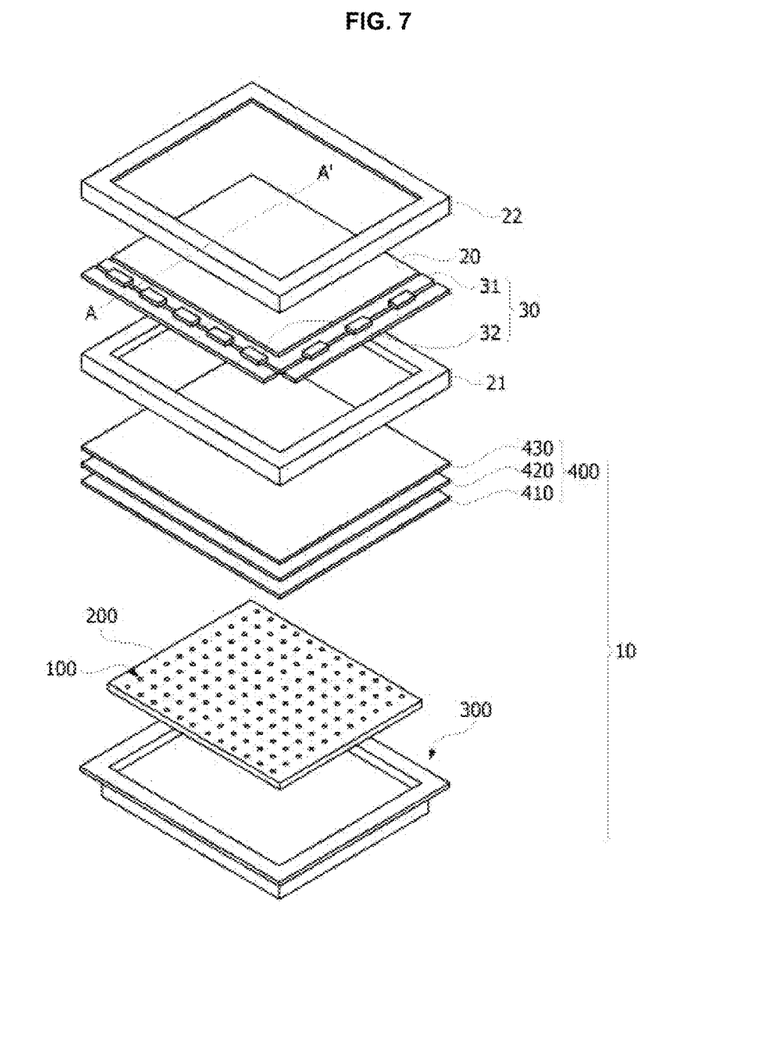
FIG. 7 is an exploded perspective view illustrating a liquid crystal display (LCD) to which the light emitting device according to one embodiment of the present application is applied.

FIG. 7 is an exploded perspective view illustrating the LCD to which the light emitting device according to one embodiment of the present application is applied. Also, FIG. 8 is a cross-sectional view along a line A-A' of the backlight unit to which the light emitting device according to one embodiment of the present application is applied.

Figure 8:
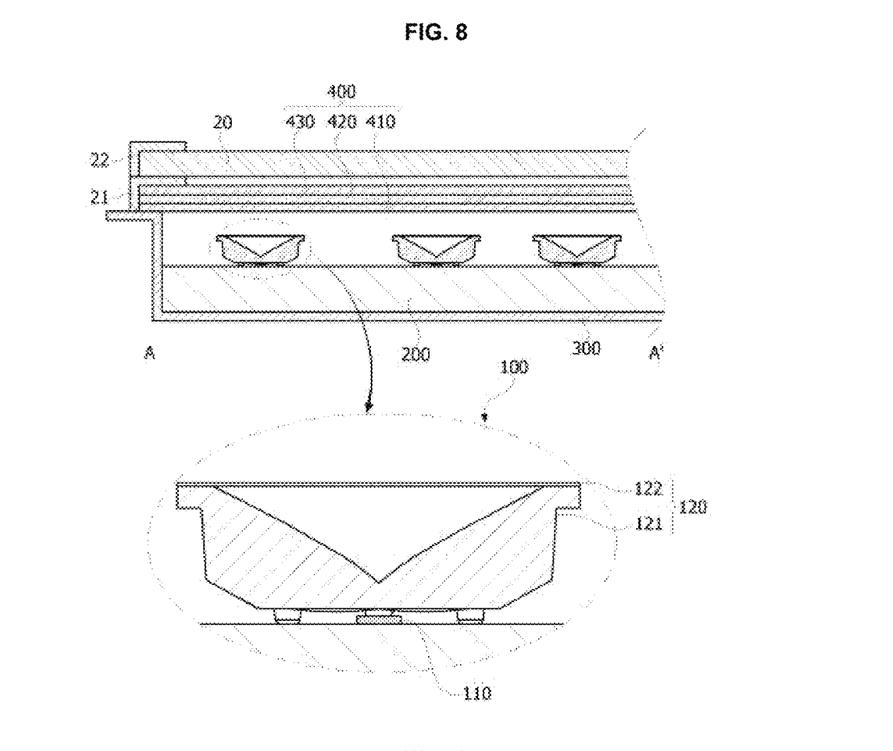
FIG. 8 is a cross-sectional view along a line A-A' of a backlight unit to which the light emitting device according to one embodiment of the present application is applied.

Referring to FIGS. 7 and 8, the LCD includes the backlight unit 10 and the liquid crystal panel 20. The liquid crystal panel 20 is a displaying part of the LCD, and may include a thin film transistor (TFT) substrate, a color filter substrate, and a liquid crystal layer interposed between the two substrates. The TFT substrate includes a plurality of gate lines, a plurality of data lines crossing the plurality of gate lines, and a TFT formed at a crossed region of each gate line and each data line.

A driving circuit part 30 may be connected to one side of the liquid crystal panel 20. The driving circuit part 30 includes a printed circuit board (PCB) 31 which supplies a scan signal to the gate lines of the TFT substrate, and a PCB 32 which supplies a data signal to the data lines thereof. The driving circuit part 30 is electrically connected with the liquid crystal panel 20 in a chip-on-film (COF) manner, a tape carrier package (TCP) manner or the like.

The LCD may further include a panel guide 21 configured to support the liquid crystal panel 20, and an upper case 22 configured to cover an edge of the liquid crystal panel 20 and coupled with the panel guide 21. The backlight unit 10 is coupled to the liquid crystal panel 20 in a direct type, and may include a bottom cover 300, a driving substrate 200, a plurality of light sources 100, and a plurality of optical sheets 400.

The bottom cover 300 may be formed of a metallic material, and may be formed in a box shape of which an upper portion is opened. For example, the bottom cover 300 may be formed by bending or curving a metal plate. The driving substrate 200 is accommodated in a bent or curved space of the bottom cover 300. The bottom cover 300 may also serve to support the optical sheets 400 and the liquid crystal panel 20.

The driving substrate 200 is formed in a plate shape, and the reflecting layer may be formed on the driving substrate 200. The reflecting layer serves to reflect the light emitted from the light emitting diode 110 and to enhance performance of the backlight unit 10.

A light source 100 may be mounted on the driving substrate 200. The light source 100 may include a plurality of light emitting elements 110 and lens 121 disposed to cover the light emitting elements 110. In FIGS. 7 and 8, for example, a case in which the light emitting diode is used as the light emitting element 110 is illustrated. Each light emitting diode 110 is arranged on the driving substrate 200, and electrically connected to the driving substrate 200. The light emitting diode 110 emits the light according to a driving signal supplied from the driving substrate 200.

Each light emitting diode 110 operates as a point light source, and an array of the light emitting diodes 110 arranged on the driving substrate 200 at regular intervals may form a surface light source. Each light emitting diode 110 may be formed in a light emitting diode package including a light emitting diode chip. Each light emitting diode 110 may radiate white light, or may uniformly radiate blue, green and red light.

The optical member 120 serves to control the luminous flux and the transmittance of the light radiated from the light emitting diode 110 through the lens 121 and the cover 122 coupled to an upper portion of the lens 121, and thus to enhance the brightness uniformity of the backlight unit 10. When the light radiated from the light emitting diode 110 is incident on the lens 121, the lens 121 serves to controls the luminous flux and to enhance the brightness uniformity.

As described with reference to FIGS. 1 to 5, the lens 121 may include the surface of incidence (referring to S1 of FIG. 3) on which the light is incident from the light emitting diode 110, the first optical surface (referring to S2 of FIG. 3) formed to be recessed toward the surface of incidence, and the second optical surface (referring to S2 of FIG. 3) formed to extend from the first optical surface S2, and the second optical surface S3 may include a plurality of sections (referring to S31 of FIG. 4) having different slopes.

The lens 121 may be provided to be separated from the lens 121. Also, the lens 121 may be provided in the IOL type in which the light emitting diode 110 is accommodated therein.

The cover 122 is bonded on the lens 121 to cover at least a part of an upper surface of the lens 121 by the adhesive member (not shown), and provided to have a light transmittance of 70% or less. Among the light passing through the lens 121 and incident on the cover 122, the cover 122 may pass only some of the light moving to a specific region, i.e., a region corresponding to the center portion of the light emitting diode 110, and thus a phenomenon in which the light is concentrated to the center portion of the light emitting diode 110 may be improved.

In FIGS. 7 and 8, for example, a case in which the optical elements 120 are arranged at regular intervals is illustrated, but the embodiment of the present application is not limited thereto. According to the embodiments of the present application, the plurality of optical elements 120 arranged at regular intervals to correspond to each light emitting diode 110 may be coupled to each other to form one structure.

The optical sheets 400 may include a diffusion sheet 410, a polarizing sheet 420, a prism sheet 430 and the like, and may be used to enhance the light property passing through the optical sheets 400. The diffusion sheet 410 serves to direct the light incident from the light sources 100 to a front of the liquid crystal panel 20, to diffuse the light to have a uniform distribution over a wide area, and then to emit the light to the liquid crystal panel 20.

The polarizing sheet 420 serves to polarize the light slantly incident on the polarizing sheet 420, and to output the light vertically. To change the direction of the light output from the diffusion sheet 410 to a vertical direction, at least one polarizing sheet 420 may be arranged under the liquid crystal panel 20. The prism sheet 430 passes the light in parallel with a transmission axis thereof, and reflects the light vertical to the transmission axis.

Meanwhile, to ensure illumination uniformity in the backlight unit 10, it is necessary to form an air gap having a predetermined size between the light emitting diode 110 and the lens 121. Also, to have the wide illumination distribution, it is necessary to reduce a size of the light emitting diode 110 or increase a size of the lens 121, and thus to ensure the illumination uniformity.

Recently, as the demand for a TFT-LCD increases, attempts to reduce the air gap between the light emitting diode 110 and the lens 121 are continuously proceeded. However, there is limitation in reducing the size of the lens 121 due to the reduced air gap, and thus it is difficult to ensure the illumination uniformity. In particular, when the backlight unit 10 is designed to have a thickness of 10 mm or less, the light is concentrated to the center portion of the light source 100, and the mura in which the center portion of the light emitting device becomes too bright occurs, and the cover region covered by one light source is also reduced.

Therefore, in the embodiment of the present application, since the cover 122 which blocks some of the light concentrated to the center portion of the lens 121 is coupled to the lens 121, the light output from the light emitting diode 110 may be effectively prevented from being concentrated to the center portion of the light source 100, and the cover region covered by the one light source 100 may be increased.

Figure 9:
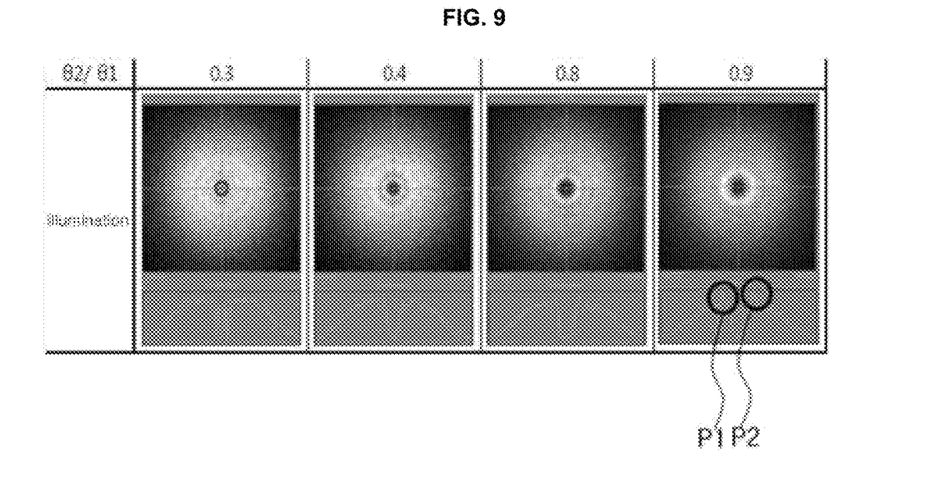
FIG. 9 is a view for explaining a critical meaning of a slope ratio of a first section and a second section of a second optical surface in the lens applied to the light emitting device according to one embodiment of the present application.

FIG. 9 is a view for explaining a critical meaning of a slope ratio of the first section and the second section of the second optical surface in the lens applied to the light emitting device according to one embodiment of the present application, and illustrating the illumination distribution according to the slope ratio of the first section and the second section.

Referring to FIG. 9, in the second optical surface S3 of the lens 121, when the slope ratio ($\theta 2/\theta 1$) of the slope of the second section S32 to the slope of the first section S31 is 0.3, 0.4 and 0.8, the illumination distribution of the light passing through the lens 121 is not considerably different from the normal distribution. However, when the slope ratio ($\theta 2/\theta 1$) of the slope of the second section S32 to the slope of the first section S31 is 0.9, it may be understood that regions P1 and P2 in which the illumination distribution is considerably different from the normal distribution are generated.

When the illumination distribution of the light passing through the lens 121 is similar to the normal distribution, it is possible to complement the illumination uniformity of the backlight unit with the reflecting layer or the diffusion sheet 410 formed on the driving substrate 200, thereby obtaining predetermined illumination uniformity. However, when illumination distribution of the light passing through the lens 121 is considerably different from the normal distribution, the problem of the illumination uniformity of the backlight unit may not be solved with the reflecting layer or the diffusion sheet 410 formed on the driving substrate 100. Therefore, in the second optical surface S3 of the lens 121, the slope ratio ($\theta 2/\theta 1$) of the slope of the second section S32 to the slope of the first section S31 satisfies 0.8 or less.

When the slope ratio ($\theta 2/\theta 1$) of the first section S31 and the second section S32 forming the second optical surface S3 of the lens 121 is less than 0.2, the clear aperture of the surface S1 of incidence may be encroached up. Therefore, the slope ratio ($\theta 2/\theta 1$) of the second section S32 to the first section S31 may be designed to satisfy 0.2 to 0.8.

According to the luminous flux control member according to the embodiment of the present application, the light radiated from the light source is uniformly diffused, and thus the illumination uniformity of the light emitting device can be improved.

The present application is directed to a luminous flux control member, a light emitting device, and a display device, which improve illumination uniformity.

There may be provided a luminous flux control member including a surface of incidence; a first optical surface formed to be recessed toward the surface of incidence and configured to reflect at least some of incident light passing through the surface of incidence; and a second optical surface formed to extend from the first optical surface and configured to reflect at least some of incident light passing through the first optical surface, wherein the second optical surface includes a plurality of sections having different slopes.

The second optical surface may be formed to extend from the first optical surface toward the surface of incidence, and may form an outer surface of the luminous flux control member.

The second optical surface may include a first section connected with the first optical surface to satisfy a first slope, and a second section formed to extend from the first section to be connected with the surface of incidence and configured to satisfy a second slope smaller than the first slope.

The first and second slopes may be less than 90 degrees. A ratio of the second slope to the first slope may satisfy 0.2 to 0.8. The second section may totally reflect at least some of the light reflected from the first optical surface. At least some of the light totally reflected by the second section may be refracted by the first optical surface or the first section.

There may be provided a light emitting device including the luminous flux control member. The light emitting device may further include a cover coupled on the first optical surface to control transmittance of the incident light passing through the first optical surface.

Terms including ordinal numbers such as "first," "second," etc. can be used to describe various components, but the components are not limited by those terms. The terms are used merely for the purpose of distinguishing one component from another. For example, a first component may be called a second component, and similarly, a second component may be called a first component without departing from the scope of rights of the invention. The term "and/or" encompasses combinations of a plurality of items or any one of the plurality of items.

It is to be noted that, in this specification, when a certain component is said to be connected to another component, the certain component may be directly connected to the other component, or a third component may be interposed therebetween. On the other hand, when a certain component is said to be directly connected to another component, no third component is interposed therebetween.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light emitting device comprising:
   a luminous flux control member comprising:
      a surface of incidence arranged to face a light emitting element;
      a first optical surface formed to be recessed toward the surface of incidence and configured to reflect at least some of incident light passing through the surface of incidence, wherein the first optical surface includes a curved portion and a flat portion; and
      a second optical surface formed to extend from the first optical surface and configured to reflect at least some of incident light reflected from the first optical surface; and
   a cover provided on the flat portion of the first optical surface, the cover to control transmittance of incident light passing through the first optical surface, the cover including a plurality of through holes, the plurality of through holes including a center hole, a first set of holes evenly arranged in a first concentric circle at a first distance from the center hole, and a second set of holes evenly arranged in a second concentric circle at a second distance from the center hole,
   wherein the second optical surface includes a plurality of sections having different slopes,
   wherein the surface of incidence is an optical surface on which the light radiated from the light emitting element is incident, and
   wherein the surface of incidence includes a first convex portion formed to protrude toward a first lower portion of the luminous flux control member, and a second convex portion formed to protrude toward a second lower portion of the luminous flux control member,
   wherein an optical axis is an axis that extends from between the first and second convex portions in a direction toward the center hole of the cover, and
   wherein a bottom of the first convex portion is located below the lowermost portion of the second optical surface with respect to a position of the optical axis,
   wherein the second optical surface consists of a first section connected at the first optical surface, and a second section connected between the first section and the surface of incidence,
   wherein both a slope of the first section and a slope of the second section are less than 90 degrees, wherein the slope of the first section means an angle formed by an outer surface of the first section with respect to a surface vertical to the optical axis, and the slope of the second section means an angle formed by an outer surface of the second section with respect to the surface vertical to the optical axis,
   wherein a ratio of the slope of the second section to the slope of the first section is 0.2 to 0.8, and
   wherein a cross section of the first section in a direction of the optical axis is a linear shape, and a cross section of the second section in a direction of the optical axis is a linear shape.

2. The luminous flux control member of claim 1, wherein the second optical surface is formed to extend from the first optical surface toward the surface of incidence, and the second optical surface forms an outer surface of the luminous flux control member.

3. The luminous flux control member of claim 1, wherein the first optical surface totally reflects at least some of the incident light to the first section, and totally reflects at least some of the rest of the incident light to the second section.

4. The luminous flux control member of claim 3, wherein the first section refracts at least some of the light totally reflected from the first optical surface.

5. The luminous flux control member of claim 3, wherein the second section totally reflects at least some of the light totally reflected from the first optical surface to the first optical surface.

6. The luminous flux control member of claim 5, wherein at least some of the light totally reflected by the second section is refracted and output by the first optical surface or the first section.

7. A light emitting device comprising;
   a luminous flux control member comprising a surface of incidence arranged to face a light emitting element, a first optical surface formed to be recessed toward the surface of incidence and configured to reflect at least some of incident light passing through the surface of incidence, and a second optical surface formed to extend from the first optical surface and configured to reflect at least some of incident light reflected from the first optical surface, wherein the first optical surface includes a curved portion and a flat portion; and
   a cover coupled on the flat portion of the first optical surface to control transmittance of the incident light passing through the first optical surface, the cover including a plurality of through holes, the plurality of through holes including a center hole, a first set of holes evenly arranged in a first concentric circle at a first distance from the center hole, and a second set of holes evenly arranged in a second concentric circle at a second distance from the center hole,
   wherein the second optical surface includes a plurality of sections having different slopes,
   wherein the surface of incidence is an optical surface on which the light radiated from the light emitting element is incident, and
   wherein the surface of incidence includes a first convex portion formed to protrude toward a first lower portion of the luminous flux control member, and a second convex portion formed to protrude toward a second lower portion of the luminous flux control member,
   wherein an optical axis is an axis that extends from between the first and second convex portions in a direction toward the center hole of the cover, and wherein a bottom of the first convex portion is located below the lowermost portion of the second optical surface with respect to a position of the optical axis, wherein the second optical surface consists of a first section connected at the first optical surface, and a second section connected between the first section and the surface of incidence, wherein both a slope of the first section and a slope of the second section are less than 90 degrees, wherein the slope of the first section means an angle formed by an outer surface of the first section with respect to a surface vertical to the optical axis, and the slope of the second section means an angle formed by an outer surface of the second section with respect to the surface vertical to the optical axis, wherein a ratio of the slope of the second section to the slope of the first section is 0.2 to 0.8, and wherein a cross section of the first section in a direction of the optical axis is a linear shape, and a cross section of the second section in a direction of the optical axis is a linear shape.

8. A display device comprising;

a luminous flux control member comprising a surface of incidence arranged to face a light emitting element, a first optical surface formed to be recessed toward the surface of incidence and configured to reflect at least some of incident light passing through the surface of incidence, and a second optical surface formed to extend from the first optical surface and configured to reflect at least some of incident light reflected from the first optical surface, wherein the first optical surface includes a curved portion and a flat portion; and a cover coupled on the flat portion of the first optical surface to control transmittance of the incident light passing through the first optical surface, the cover including a plurality of through holes, the plurality of through holes including a center hole, a first set of holes evenly arranged in a first concentric circle at a first distance from the center hole, and a second set of holes evenly arranged in a second concentric circle at a second distance from the center hole wherein the second optical surface includes a plurality of sections having different slopes, wherein the surface of incidence is an optical surface on which the light radiated from the light emitting element is incident, wherein the surface of incidence includes a first convex portion formed to protrude toward a first lower portion of the luminous flux control member, and a second convex portion formed to protrude toward a second lower portion of the luminous flux control member, wherein an optical axis is an axis that extends from between the first and second convex portions in a direction toward the center hole of the cover and wherein a bottom of the first convex portion is located below the lowermost portion of the second optical surface with respect to a position of the optical axis, wherein the second optical surface consists of a first section connected at the first optical surface, and a second section connected between the first section and the surface of incidence, wherein both a slope of the first section and a slope of the second section are less than 90 degrees, wherein the slope of the first section means an angle formed by an outer surface of the first section with respect to a surface vertical to the optical axis, and the slope of the second section means an angle formed by an outer surface of the second section with respect to the surface vertical to the optical axis, wherein a ratio of the slope of the second section to the slope of the first section is 0.2 to 0.8, and wherein a cross section of the first section in a direction of the optical axis is a linear shape, and a cross section of the second section in a direction of the optical axis is a linear shape.

\* \* \* \* \*